United States Patent
Clark

(10) Patent No.: US 6,793,171 B1
(45) Date of Patent: Sep. 21, 2004

(54) METHOD AND SYSTEM FOR FLYING AN AIRCRAFT

(75) Inventor: Walter D. Clark, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/406,047

(22) Filed: Apr. 2, 2003

(51) Int. Cl.[7] .............................................. B64D 11/00
(52) U.S. Cl. ..................... 244/1 R; 244/1 R; 244/75 R; 244/118.5
(58) Field of Search .............................. 244/90 R, 1 R, 244/118.5, 129.1, 75 R, 36, 90 A

(56) References Cited

U.S. PATENT DOCUMENTS

| | | | |
|---|---|---|---|
| 2,303,713 A | 12/1942 | Thompson | 244/113 |
| 2,406,588 A | 8/1946 | Cornelius | 214/13 |
| 2,494,208 A | 1/1950 | Schultz | 244/90 |
| 2,511,502 A | 6/1950 | Gluhareff | 244/13 |
| 2,650,780 A * | 9/1953 | Northrop et al. | 244/36 |
| 2,660,383 A | 11/1953 | Feeney et al. | 244/83 |
| D172,465 S | 6/1954 | Del Mar | D71/1 |
| D220,588 S | 4/1971 | Holmes | D12/7 |
| 3,659,810 A | 5/1972 | Robertson | 244/76 R |
| D248,745 S | 8/1978 | Jager | D12/7 |
| 4,146,200 A | 3/1979 | Borzachillo | 244/213 |
| 4,466,586 A | 8/1984 | Burnham | 244/75 R |
| 4,482,115 A | 11/1984 | Lassiter, Jr. | 244/220 |
| D314,366 S * | 2/1991 | Waaland et al. | D12/333 |
| D328,345 S | 7/1992 | Ganse | D23/393 |
| 5,255,881 A | 10/1993 | Rao | 244/199 |
| D365,545 S | 12/1995 | Wainfan et al. | D12/333 |
| 5,971,319 A * | 10/1999 | Lichtenberg et al. | 244/1 R |
| 6,341,571 B1 | 1/2002 | Russell et al. | 114/39.21 |
| 2002/0164559 A1 * | 11/2002 | Ransom et al. | 434/37 |

OTHER PUBLICATIONS

"And a Flight Fact We'd Rather Not Check" Patrick Ivers from and article from Dec. 1993.*

* cited by examiner

Primary Examiner—Galen L. Barefoot
(74) Attorney, Agent, or Firm—Fulbright & Jaworski LLP

(57) ABSTRACT

A method for flying an aircraft includes flying the aircraft at a first approximately level position and changing the flight of the aircraft from the first approximately level position to a climbing position. The method includes changing the flight of the aircraft from the climbing position to a second approximately level position to achieve a weightless state during the change to the second approximately level position and rolling the aircraft during the weightless state using one or more rolling control surfaces of the aircraft to establish a bank for a turn without creating adverse yaw. The aircraft does not include a deflectable spoiler, fin or rudder to counter adverse yaw. The rolling control surfaces of the aircraft may comprise elevons of the aircraft.

18 Claims, 2 Drawing Sheets

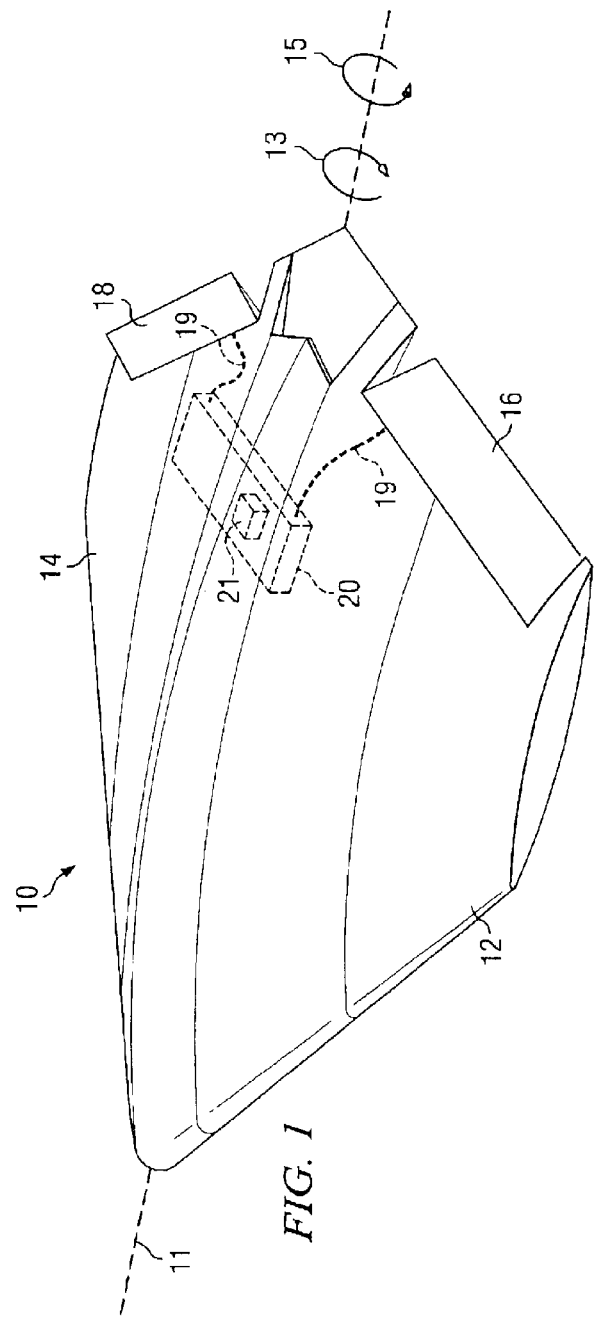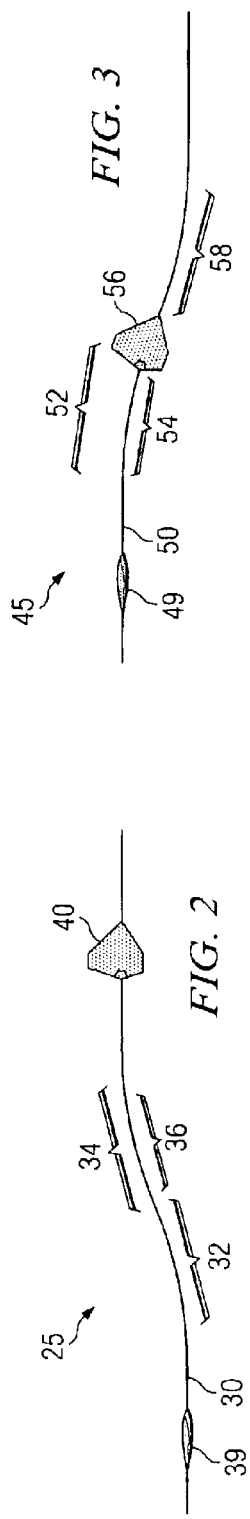

METHOD AND SYSTEM FOR FLYING AN AIRCRAFT

TECHNICAL FIELD OF THE INVENTION

This invention relates generally to the field of aircraft and, more specifically, to a method and system for flying an aircraft.

BACKGROUND OF THE INVENTION

Aircraft generally have a variety of control surfaces that can be deflected to cause the aircraft to perform maneuvers during flight. Such control surfaces may include spoilers, flaps or rudders that may facilitate a yaw maneuver for the aircraft. Such yaw control devices are also typically used to counter adverse yaw during roll maneuvers.

The deflection, hinge lines and end gaps of such control surfaces or components impair the aircraft's radar cross section, which in turn decreases the stealthiness of the aircraft towards radar. The fewer deflectable surfaces or components on the body or wing of the aircraft, the greater the stealthiness of the aircraft towards radar.

SUMMARY OF THE INVENTION

The present invention provides a method and system for flying an aircraft that substantially eliminates or reduces at least some of the disadvantages and problems associated with previous methods and systems.

In accordance with a particular embodiment of the present invention, a method for flying an aircraft includes flying the aircraft at a first approximately level position and changing the flight of the aircraft from the first approximately level position to a climbing position. The method includes changing the flight of the aircraft from the climbing position to a second approximately level position to achieve a weightless state during the change to the second approximately level position and rolling the aircraft during the weightless state using one or more rolling control surfaces of the aircraft to establish a bank for a turn without creating adverse yaw. The aircraft does not include a deflectable spoiler, fin or rudder to counter adverse yaw. The rolling control surfaces of the aircraft may comprise elevons of the aircraft.

In accordance with another embodiment, a method for flying an aircraft includes flying the aircraft at a first approximately level position and changing the flight of the aircraft from the first approximately level position to a descending position to achieve a weightless state during the change to the descending position. The method includes rolling the aircraft during the weightless state using one or more rolling control surfaces of the aircraft to establish a bank for a turn without creating adverse yaw and changing the flight of the aircraft from the descending position to a second approximately level position. The aircraft does not include a deflectable spoiler, fin or rudder to counter adverse yaw.

Changing the flight of the aircraft from the first approximately level position to a descending position may comprise negatively changing a pitch control device associated with the aircraft, and changing the flight of the aircraft from the descending position to a second approximately level position may comprise positively changing a pitch control device associated with the aircraft. The rolling control surfaces of the aircraft may comprise elevons of the aircraft.

Technical advantages of particular embodiments of the present invention include a method for flying an aircraft without creating adverse yaw. Thus, the aircraft does not require a deflectable spoiler, fin or rudder to counter adverse yaw, and the aircraft therefore has a much cleaner radar cross-section for greater stealth. The method may also be used to establish a bank for turning the aircraft despite the absence of a deflectable spoiler, fin or rudder.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which:

FIG. 1 illustrates an isometric view of an aircraft which may be utilized in an embodiment of the present invention;

FIG. 2 illustrates a flight maneuver for an aircraft, in accordance with an embodiment of the present invention;

FIG. 3 illustrates another flight maneuver for an aircraft, in accordance with an embodiment of the present invention.

DETAILED DESCRIPTION OF THE INVENTION

Figure 4:
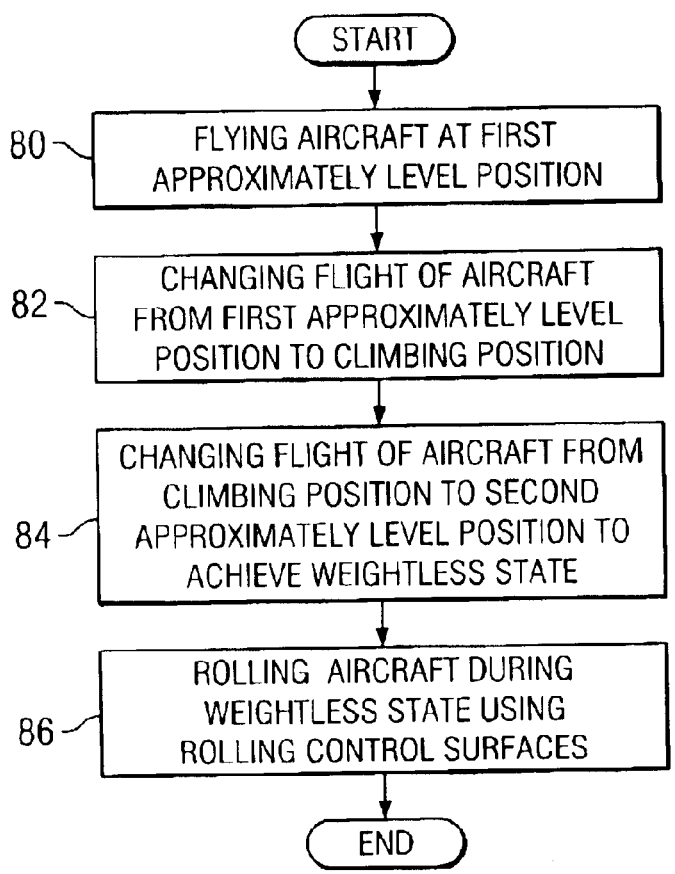
FIG. 4 is a flow chart illustrating a method for flying, in accordance with an embodiment of the present invention.

FIG. 1 illustrates an isometric view of an aircraft 10 which may be utilized in an embodiment of the present invention. Aircraft 10 includes an airfoil 12 and an airfoil 14. In the illustrated embodiment, airfoils 12 and 14 comprise wings of aircraft 10. Airfoils 12 and 14 include deflectable portions or control surfaces that aid in control maneuvers of aircraft 10. Such deflectable portions may include ailerons, elevons, conformal warping surfaces or other components. In this embodiment, airfoil 12 includes an elevon 16, and airfoil 14 includes an elevon 18. Elevons 16 and 18 are deflectable portions movably coupled to airfoils 12 and 14, respectively.

Elevons 16 and 18 are controllably deflectable to facilitate a control maneuver of aircraft 10. The facilitated control maneuver may include a pitch maneuver and/or a roll maneuver. The roll maneuver may comprise rolling aircraft 10 about its longitudinal axis, represented by centerline 11. For example, such roll may be in the direction of arrow 13 or in the direction of arrow 15. Deflecting elevons 16 and 18 in the same direction but to different degrees may facilitate both a pitch and a roll maneuver. Controlling the deflection of elevons 16 and 18 includes controlling both the direction of such deflections and the degrees to which each elevon is deflected. Elevons 16 and 18 are operable to deflect in similar or varying degrees in different directions or in similar or varying degrees in the same direction at the same time to facilitate a control maneuver of aircraft 10.

Control of components of aircraft 10, such as elevons 16 and 18, is performed by a control module 20. Control module 20 may be coupled to elevons 16 and 18 through communication links 19 and may control elevons 16 and 18 in part through a pitch control device 21 of control module 20. Control module 20 includes flight laws software. The flight laws may be supplemented by access to air data, which indicates airspeed, angle of attack and angle of sideslip for the software. Control module 20 also has access to sensors for acceleration data in roll, pitch and yaw. When a sensor indicates that acceleration for pitch is zero, then aircraft 10 may be considered "weightless," as further discussed below.

While aircraft 10 includes elevons 16 and 18 to facilitate a pitch and/or roll maneuver, aircraft 10 does not include a separate spoiler, fin or rudder, or a traditional yaw device or control surface whose primary function is to facilitate a yaw maneuver of the aircraft. Aircraft 10 is able to turn at typical flight altitude by utilizing the flight maneuvers further described below with respect to FIGS. 2 and 3. Moreover, as described below such roll maneuvers do not create adverse yaw that must be countered by a separate yaw device, as is typically created in traditional roll maneuvers.

It should be understood that the size of components, such as the elevons, of various aircraft utilized in particular embodiments of the invention may be varied in order to change the effect such components have on particular embodiments of a flight maneuver described herein. The aircraft may be composed of spars, struts, ribs, solid sections, hollow sections, bulkheads, skin, and/or any other suitable structure. The aircraft may be made of steel, aluminum, titanium, composite, and/or any other suitable material. Particular embodiments of the present invention may utilize aircraft with airfoils and other components having shapes or configurations other than the shapes and configurations of the airfoils and other components illustrated herein.

FIG. 2 illustrates a flight maneuver 25 through which an aircraft, such as aircraft 10 of FIG. 1, may roll without utilizing a yaw device for countering an adverse yaw. Flight maneuver 25 involves rolling the aircraft while flying "weightless," or when the weight is taken off the wings of the aircraft. This occurs when the aircraft flies in a parabolic arc. When the wings provide no lift, the component used to facilitate roll (for example, an elevon) can do so without introducing an adverse yaw. With a bank established, the weight may then be put back on the wings in order to complete a turn. The weight may again be taken off of the wings again so that the roll component can take the bank out.

An aircraft flies at an approximately level position 39 according to flight path 30. At segment 32, the aircraft pulls up prior to the initiation of the parabolic arc. In other words, the direction of the aircraft changes from flying at an approximately level position to flying at a climbing position as illustrated. This operation is accomplished by changing the deflection of control surfaces or components of the aircraft, such as elevons to increase an angle of attack. Such change may be effected by positively changing a pitch control device of control module 20. Next, at segment 34, the aircraft pushes over to begin a parabolic arc. In other words, the direction of the aircraft changes from flying in the climbing position to flying at an approximately level position and in so doing flies through a path that is a section of a parabolic arc. The elevons in this case are deflected down to lower an angle of attack. Such deflection may be effected by negatively changing the pitch control device of control module 20. It should be understood that the pull up and push down comprise pitch maneuvers and may be accomplished by deflecting elevons or other control surfaces of the aircraft.

At segment 36, during the last approximately quarter or half of a second of the pull up/push over maneuver, weight is off the wings and the aircraft is rolled in order to establish a bank that may aid in turning the aircraft. In particular embodiments, such roll may be facilitated by the deflection of elevons of the aircraft. The bank of the aircraft is illustrated at position 40. The position of the aircraft during such bank may vary depending on the amount and direction of the roll. The weight may then be put back on the wings to complete a turn. This process may be repeated in order to take the bank out.

The aircraft rolls only while weightless so that the roll moment produced by components of the aircraft, such as ailerons or elevons, is produced by an equal but opposite increment of lift rather than from lift that is greater on one side than the other. Thus, adverse yaw that would be produced by such a difference in lift during the roll maneuver is eliminated, thereby eliminating the need for a yaw device to counter such an adverse yaw.

Since weight is constantly being taken off and put back on the wings in flight maneuver 25, the maneuver is particularly suited for unmanned aircraft. This maneuver may be very useful when an aircraft is flying over a territory where a minimum of radar cross-section is desired, since it does not require the deflection of any yaw device which would degrade a stealthy radar cross section.

FIG. 3 illustrates an alternative flight maneuver 45 through which an aircraft, such as aircraft 10 of FIG. 1, may roll without utilizing a yaw device for countering an adverse yaw when the aircraft may not be flying at enough velocity to make the initial climb in altitude utilized by the maneuver described with respect to FIG. 2. Maneuver 45 also involves rolling the aircraft while flying "weightless," or when the weight is taken off the wings of the aircraft. Maneuver 45 involves a push over/pull up maneuver as opposed to the pull up/push over maneuver of FIG. 2.

An aircraft flies at an approximately level position 49 according to flight path 50. At segment 52, the aircraft pushes over in order to begin the parabolic arc and to achieve a weightless state. In other words, the direction of the aircraft changes from flying at an approximately level position to flying at a descending position as illustrated. This operation is accomplished by changing the deflection of control surfaces or components of the aircraft, such as elevons, so as to lower an angle of attack. The elevons in this case are deflected down to arc over into a dive. Such deflection may be effected by negatively changing a pitch control device of control module 20. At segment 54, during the beginning of the push over segment, the aircraft has the weight removed from the wings, and at this time the aircraft rolls to establish a bank that may aid in turning the aircraft. The bank of aircraft is illustrated at position 56. Next, at segment 58, the aircraft pulls up to come out of the dive. Such pull up may be effected by positively changing the pitch control device.

As in the flight maneuver 25 described with respect to FIG. 2, the aircraft rolls only while weightless so that the roll moment produced by components of the aircraft, such as ailerons or elevons, is produced by an equal but opposite increment of lift rather than from lift that is greater on one side than the other. Thus, adverse yaw that would be produced by such a difference in lift during the roll maneuver is limited, thereby reducing the need for a yaw device to counter such an adverse yaw. It is important that roll is commanded when the weight has been removed from the wings, or with the aircraft flying a section of a parabolic, or ballistic, path.

An aircraft without a spoiler, fin or rudder or other separate yaw control device, such as aircraft 10 of FIG. 1, may utilize the flight maneuvers described above repeatedly in order to complete a flight. As discussed above, these maneuvers are completed without the use of fins, spoilers, rudders or other yaw control devices. The utilization of such components typically adds to the radar cross-section of an aircraft, making the aircraft more visible to radar. Thus, these maneuvers may be particularly useful when flying over a territory where stealthy flight is desired. In order to make coordinated rolls into a bank when maneuvers described above may be difficult, such as may be required during takeoff and landing, the aircraft may utilize open canted landing gear doors which are hinged at an angle to a longitudinal axis of the aircraft.

FIG. 4 is a flowchart illustrating a method for flying without creating adverse yaw, in accordance with an embodiment of the present invention. The method begins at step 80 with flying the aircraft at a first approximately level position. At step 82, the flight of the aircraft is changed from the first approximately level position to a climbing position to begin a parabolic arc. Such change may be accomplished by positively changing a pitch control device of a control module of the aircraft.

At step 84, the flight of the aircraft is changed from the climbing position to a second approximately level position to achieve a weightless state during the change. This change to the second approximately level position may be accomplished by negatively changing the pitch control device of the control module of the aircraft. At step 86, the aircraft is rolled during the weightless state using one or more rolling surfaces of the aircraft, such as elevons, to establish a bank for a turn. The rolling maneuver of step 86 may be performed before completion of step 84 so that it is performed during the weightless state. This rolling maneuver during the weightless state does not create adverse yaw which must be countered by a separate yaw device. Thus, the aircraft does not include a deflectable spoiler, fin or rudder to counter adverse yaw.

Steps may be modified, added or omitted without departing from the scope of the invention. Additionally, steps may be performed in any suitable order without departing from the scope of the invention.

Although the present invention has been described in detail, various changes and modifications may be suggested to one skilled in the art. It is intended that the present invention encompass such changes and modifications as falling within the scope of the appended claims.

What is claimed is:

1. A method for flying an aircraft, comprising:

flying the aircraft at a first approximately level position;

changing the flight of the aircraft from the first approximately level position to a climbing position;

changing the flight of the aircraft from the climbing position to a second approximately level position to achieve a weightless state during the change to the second approximately level position;

rolling the aircraft during the weightless state using one or more rolling control surfaces of the aircraft to establish a bank for a turn without creating adverse yaw; and wherein the aircraft does not include a deflectable spoiler, fin or rudder to counter adverse yaw.

2. The method of claim 1, wherein changing the flight of the aircraft from the first approximately level position to a climbing position comprises positively changing a pitch control device associated with the aircraft.

3. The method of claim 1, wherein changing the flight of the aircraft from the climbing position to a second approximately level position comprises negatively changing a pitch control device associated with the aircraft.

4. The method of claim 1, wherein the rolling control surfaces of the aircraft comprise elevons of the aircraft.

5. The method of claim 1, wherein the aircraft does not include a deflectable yaw device to counter adverse yaw.

6. A method for flying an aircraft, wherein each turn during flight comprises:

flying the aircraft at a first approximately level position;

changing the flight of the aircraft from the first approximately level position to a climbing position;

changing the flight of the aircraft from the climbing position to a second approximately level position to achieve a weightless state during the change to the second approximately level position;

rolling the aircraft during the weightless state using one or more rolling control surfaces of the aircraft to establish a bank for the turn without creating adverse yaw.

7. The method of claim 6, wherein the aircraft does not include a deflectable spoiler, fin or rudder.

8. The method of claim 6, wherein the aircraft does not include a deflectable yaw device to counter adverse yaw.

9. The method of claim 6, wherein changing the flight of the aircraft from the first approximately level position to a climbing position comprises positively changing a pitch control device associated with the aircraft.

10. The method of claim 6, wherein changing the flight of the aircraft from the climbing position to a second approximately level position comprises negatively changing a pitch control device associated with the aircraft.

11. The method of claim 6, wherein the rolling control surfaces of the aircraft comprise elevons of the aircraft.

12. A method for flying an aircraft, comprising:

flying the aircraft at a first approximately level position;

changing the flight of the aircraft from the first approximately level position to a descending position to achieve a weightless state during the change to the descending position;

rolling the aircraft during the weightless state using one or more rolling control surfaces of the aircraft to establish a bank for a turn without creating adverse yaw;

changing the flight of the aircraft from the descending position to a second approximately level position; and wherein the aircraft does not include a deflectable spoiler, fin or rudder to counter adverse yaw.

13. The method of claim 12, wherein changing the flight of the aircraft from the first approximately level position to a descending position comprises negatively changing a pitch control device associated with the aircraft.

14. The method of claim 12, wherein changing the flight of the aircraft from the descending position to a second approximately level position comprises positively changing a pitch control device associated with the aircraft.

15. The method of claim 12, wherein the rolling control surfaces of the aircraft comprise elevons of the aircraft.

16. The method of claim 12, wherein the aircraft does not include a deflectable yaw device to counter adverse yaw.

17. A system for flying an aircraft, comprising:

a control module coupled to one or more control surfaces of the aircraft, the control module operable to:

change the flight of the aircraft from a first approximately level position to a climbing position;

change the flight of the aircraft from the climbing position to a second approximately level position to achieve a weightless state during the change to the second approximately level position;

roll the aircraft during the weightless state using the one or more rolling control surfaces to establish a bank for a turn without creating adverse yaw; and wherein the aircraft does not include a deflectable spoiler, fin or rudder to counter adverse yaw.

18. The system of claim 17, wherein the rolling control surfaces of the aircraft comprise elevons of the aircraft.

* * * * *